Oct. 5, 1926.

H. T. KRAFT

SHOCK ABSORBER

Filed July 11, 1923

INVENTOR

HERMAN T. KRAFT

BY

O. E. Bee

ATTORNEY

Patented Oct. 5, 1926.

1,602,079

UNITED STATES PATENT OFFICE.

HERMAN T. KRAFT, OF AKRON, OHIO, ASSIGNOR OF ONE-THIRD TO O. E. BEE, OF AKRON, OHIO.

SHOCK ABSORBER.

Application filed July 11, 1923. Serial No. 650,843.

My invention relates to shock absorbers for automobiles, and it has, for its primary object, to provide a highly efficient device which shall require a minimum of attention to insure uniform operating characteristics.

There are, of course, a large number of various types of shock absorbers which are more or less successful, but nearly all such devices have certain objectionable features, which it is highly desirable to overcome. My shock absorber is of the type depending for its operation upon the utilization of air, but it functions in an entirely different manner from any devices with which I am acquainted that utilize air in any manner.

For example, there are numbers of shock absorbers which utilize compressed air that is confined within chambers and possibly passed from one chamber to another in order to secure the desired dampening effect upon the relative movement of parts to which they are secured. However, in any device in which compressed air is utilized, it is as necessary to maintain a certain degree of pressure therein as it to maintain a sufficient degree of pressure in the pneumatic tires utilized on the automobiles. Obviously, a device which necessitates such attention is more or less trouble to the motorist, and its advantageous features are offset to a certain extent as a result.

One object of my invention is to provide a shock absorber which shall operate alternately upon compressed air and by establishing a vacuum, but which shall be independent of any degree of compressed air, except that which is automatically provided.

There are also shock absorbers which depend for their principle of operation upon braking devices, which, however, only function to prevent a sudden rebound of the frame of the machine away from the spring upon which it is mounted. Although such devices improve the operating characteristics of motor vehicles, it is obvious that a device which functions to not only reduce the speed of rebound, but also to check the initial downward movement of the frame, is more desirable and will provide more satisfactory operating conditions.

Another object of my invention resides in the provision of a shock absorber which shall function in both the downward and upward movement of the body of a motor car, and, consequently, tend to smooth out all shocks experienced in ordinary travel.

Many devices now on the market, although providing satisfactory operation, are quite expensive to manufacture owing to the number of parts involved in their structures, and to the necessity of obtaining high grade machine work or expensive materials.

A further object of my invention is to provide a shock absorber which shall embody a small number of parts, which need not be carefully machined or constructed of expensive material to obtain efficient and continued satisfactory operation throughout the life of the device.

A still further object of my invention is to provide a device which, after being properly secured upon an automobile and adjusted to obtain the most satisfactory operating conditions with the particular type of machine upon which it is utilized, may be completely disregarded so far as lubrication, further adjustment, or such attention is concerned.

It is, of course, desirable that any accessories added to motor cars be of such nature as to obviate noises resulting from loose fitting parts, and the device of my invention is particularly desirable in this respect.

A further outstanding feature of my improved device is the fact that it contains no relatively moving parts which are subjected to excessive wear, or which must be carefully fitted to obtain satisfactory operation. The device is further distinguished by the fact that one size may be readily adjusted to function properly upon motor cars of a wide variety of types and weights.

Another desirable feature that should be noted in my invention is the fact that the device not only operates upon movement of the motor body in both directions, but the added advantage that the device may be adjusted to resist the movement to a different extent in each direction, and, consequently, the inherent flexibility of the vehicle springs need not be lessened to a sufficient extent as to cause the car to be rough riding on this account.

With these and other objects in view, my invention will be more fully described, illustrated in the drawings, in which like numerals indicate corresponding parts, and then more fully pointed out in the appended claims.

Figure 1:
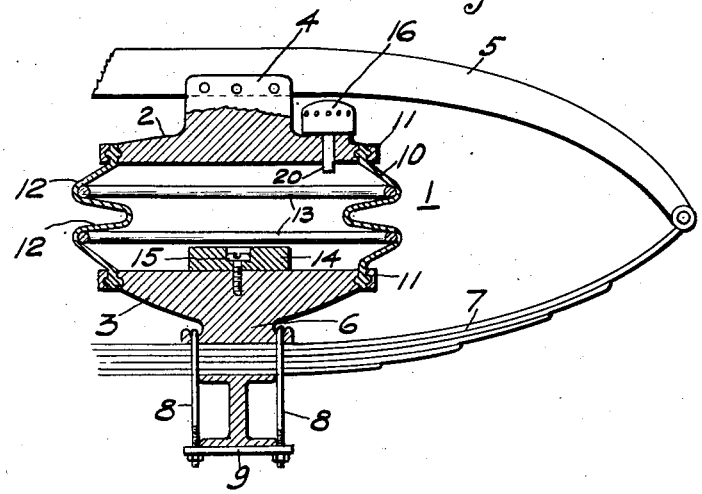
Fig. 1 is a sectional view of a shock absorber, properly mounted between the spring and frame of a motor car, constructed in accordance with my invention.

In practicing my invention, I provide a shock absorber by utilizing a plurality of metallic end members, which are connected by a cylindrical tube of flexible material to provide a fluid container. The flexible material has folded portions which give it an accordion-like shape, and supporting members, such as metallic rings, are disposed in the folded portions to prevent collapse of the flexible tube in a direction transverse to its longitudinal axis. An adjustable valve is mounted upon one of the metallic end members to restrict and control the passage or flow of fluid to and from the interior of the container.

The principle upon which the device operates is that when it is mounted between the frame and the spring of a motor car, the flexible tube thereof is collapsed when the frame approaches the spring, and the air contained within the tube is forced out through the adjustable valve at a predetermined rate. As a result of restricting the escape of air from the container, the downward movement of the frame towards the spring is retarded. The air is forced out of the container and establishes a vacuum therein, or a partial vacuum, depending upon the extent to which the device is collapsed. By reason of the partial vacuum being established in the container, when the body of the vehicle tends to rebound, the movement is retarded by atmospheric pressure and by the rate at which air is again admitted to the container through the adjustable valve.

A better understanding of my invention may be had by reference to the drawings in which a shock absorber 1 is shown comprising a plurality of metallic end members 2 and 3. Both of the end members are circular and are provided with suitable projecting portions to permit of fastening them to the machine. For example, the member 2 has a projection 4 which is bolted to a frame member 5 of a motor car. The member 3 has a projection 6 which is secured upon a spring 7 of the machine by means of a plurality of U-bolts 8 that clamp the portion 6 and are secured to a plate 9 disposed beneath the axle of the machine. A flexible tube 10 is secured to the members 2 and 3 by means of clamping rings 11 to form a fluid-tight container. The tube 10 may be formed of any suitable material, such as close woven fabric, fabric treated with rubber, pure rubber, or rubber compound made of tough, durable stock. The tube 10 is also formed with folded portions 12 in which supporting rings 13 are disposed to prevent the flexible material from being collapsed inwardly by external pressure when a partial vacuum is established therein. The rings 13 need not be of high grade material, as it is only necessary that they form a rigid support for portions of the tube 10. A resilient block 14 of rubber is mounted upon the member 3 by means of a counter-sunk screw 15 to prevent the member 2 from being forced thereagainst when an exceptionally severe shock is experienced, the parts thus being prevented from being broken by reason of a metal to metal percussion.

Figure 2:
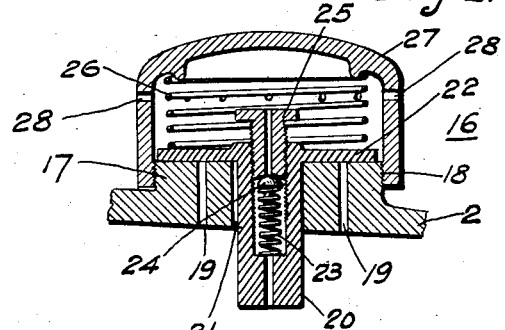
Fig. 2 is a sectional view of an adjustable valve that is utilized in the device shown in Fig. 1.
Figure 3:
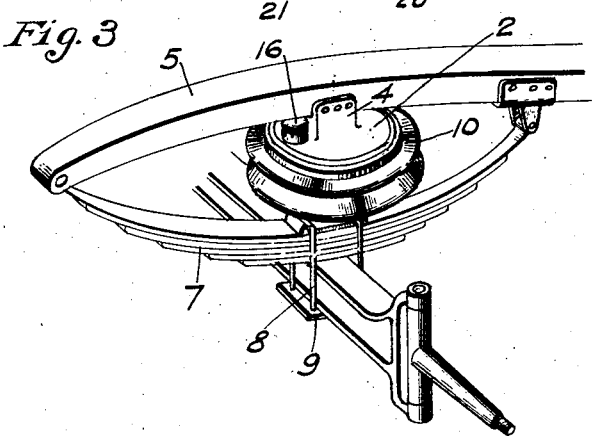
Fig. 3 is a perspective view of a portion of a motor car having a shock absorber mounted thereon that is constructed in accordance with the principles of my invention.

In order to control the action of the shock absorber and make it adjustable for a variety of types and weights of machines, I utilize a valve member 16, which is clearly shown in Fig. 2. The member 2 is provided with a raised portion 17, which is externally grooved, as indicated at 18, and provided with a series of openings 19 to form a part of the valve. A member 20 of T-shape has its shank projecting through an enlarged opening 21 in the member 2, and its head 22 resting upon the exterior surface thereof over the openings 19. The shank 20 is provided with a central opening having an enlarged portion in which a spring 23, carrying a valve-closing member 24, is disposed and adapted to be compressed by a centrally perforated block 25 screwed into the opening. A spring 26 is disposed upon the head 22 and confined within a cap 27 adapted to be screwed upon the projection 17. The cap 27 is provided with a series of openings 28, which form exhaust and inlet openings for air as it passes into and out of the container.

It will be apparent from the foregoing description that the shock absorber functions on both the downward movement of the frame 5, as well as upon its movement in a direction away from the spring 7. When the frame 5 approaches the spring 7, the flexible tube 10 is compressed, and the air confined within the container is forced through the valve 16, by passing through the openings 19 and raising the head 22 against the compressive action of the spring 26. The air is thus permitted to escape from the openings 28 provided in the cap 27. It will be appreciated that the rate of escape of air from the shock absorber may be easily regulated by adjusting the cap member 27 to compress the spring 26 to any desired extent, whereby the degree of pressure required to raise the head of the member 20 is either increased or decreased.

When the frame 5 rebounds from the spring 7, it tends to pull the tube 10 to its original position and separate the members 2 and 3 from each other. This action is resisted by the atmospheric pressure upon the exterior surface of the shock absorber and by reason of the fact that the admission of air to the shock absorber is controlled by the valve 16. The air enters the valve 16 through the openings 28 in the cap, and through the passage provided in the block 25 and the member 20. The passage of the air is resisted by the valve closing member 24, which is held against the opening in the block 25 by the spring 23. The degree of pressure necessary to displace the member 24 is easily regulated by the position of the block 25. The rate of the inlet of air to the container to equalize the pressure within the container with atmospheric is definitely controlled by the adjustment of the block 25.

It will be readily apparent from the foregoing description that the device of my invention involves a minimum number of parts which are not subjected to excessive wear, since the action of the shock absorber as a whole depends more upon the differential pressure existing between the interior and exterior thereof, rather than upon the proper fitting or movement of any of its members. It will be further appreciated that after having once obtained the proper adjustment of the shock absorber, it requires no further attention during the time of its use.

Although I have shown and specifically described a device that is constructed in accordance with my invention, it is obvious that minor changes may be made in the construction and in the selection of material without departing from the spirit or scope of the invention, and I desire, therefore, that no limitations shall be imposed except such as are indicated in the appended claims.

What I claim is:

1. A shock absorber comprising a container formed partially of flexible material and adustable means for restricting the free passage of air into and out of the container.

2. A shock absorber comprising a container formed partially of flexible material and adustable means for automatically restricting the free passage of air into and out of the container.

3. A shock absorber comprising a container adapted to confine a compressible fluid having an opening provided therein and adjustable means for restricting the passage of the fluid through the opening.

4. A shock absorber comprising a flexible container, means for permitting the escape of fluid confined by the container when it is collapsed, and means for maintaining the shape of the container against pressure applied to its transverse axis.

5. A shock absorber comprising a flexible container, means for controlling the escape of fluid confined by the container when it is collapsed, and means for maintaining the shape of the container against pressure applied to its transverse axis.

6. A shock absorber comprising a container formed partially of flexible material provided with folded portions, supporting members disposed in the folded portions, and means for controlling the flow of fluid to and from the container.

7. A shock absorber comprising a container formed partially of flexible material provided with folded portions, supporting members disposed in the folded portions, and means for automatically controlling the flow of fluid to and from the container.

8. A shock absorber comprising a container formed partially of flexible material provided with folded portions, rigid rings disposed in the folded portions, and means for automatically controlling the flow of fluid to and from the container.

9. A shock absorber comprising a container formed of metallic end members connected by a flexible material provided with folded portions, rigid rings disposed in the folded portions, and means for controlling the flow of a fluid to and from the container.

10. A shock absorber comprising a container formed of metallic end members connected by a flexible material provided with folded portions, rigid rings disposed in the folded portions, and means for controlling the flow of a fluid to and from the container, said means including a valve.

11. A shock absorber comprising a container formed of metallic end members connected by a flexible material provided with folded portions, rigid rings disposed in the folded portions, and means for controlling the flow of a fluid to and from the container, said means including an adjustable valve.

12. A shock absorber comprising metallic members, a cylinder of flexible material provided with folded portions secured to the members, means for securing the members to the frame and spring of a vehicle, metallic rings disposed in the folded portions, and an adjustable valve mounted in one of the members to provide a restricted air passage to the container thus formed.

13. A shock absorber comprising metallic members, a cylinder of flexible material provided with folded portions secured to the members, means for securing the members to the frame and spring of a vehicle, metallic rings disposed in the folded portions, and a valve mounted in one of the members adapted to control the admission and escape of air to the container formed by the members and flexible material.

14. A shock absorber comprising a container connected to relatively movable members, means for establishing at least a partial vacuum in the container by movement of the members, and means for relieving such vacuum by admission of air at a controlled rate.

15. A shock absorber comprising a flexible container connected to relatively movable members, means for establishing at least partial vacuum in the container by movement of the members and means for relieving such vacuum by admission of air at a controlled rate.

16. A shock absorber comprising a container connected to relatively movable members, means for establishing at least a partial vacuum in the container by movement of the members, means for controlling the rate at which the vacuum is established and means for relieving such vacuum by admission of air at a controlled rate.

17. A shock absorber comprising a plurality of piston members connected by a flexible container, one of said members having a valve mounted therein.

In witness whereof, I have hereunto signed my name.

HERMAN T. KRAFT.